Figure 7:
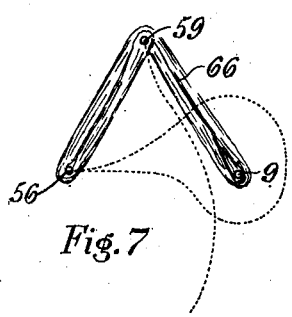
Figure 8:
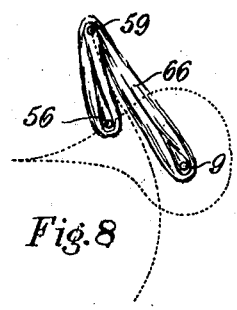
Figure 9:
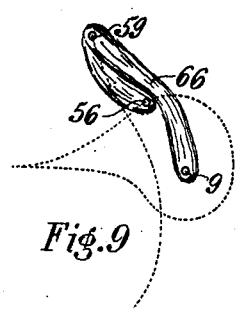
Figure 10:
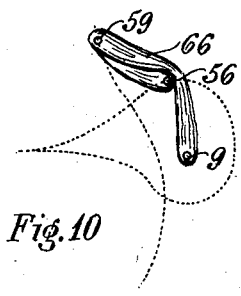

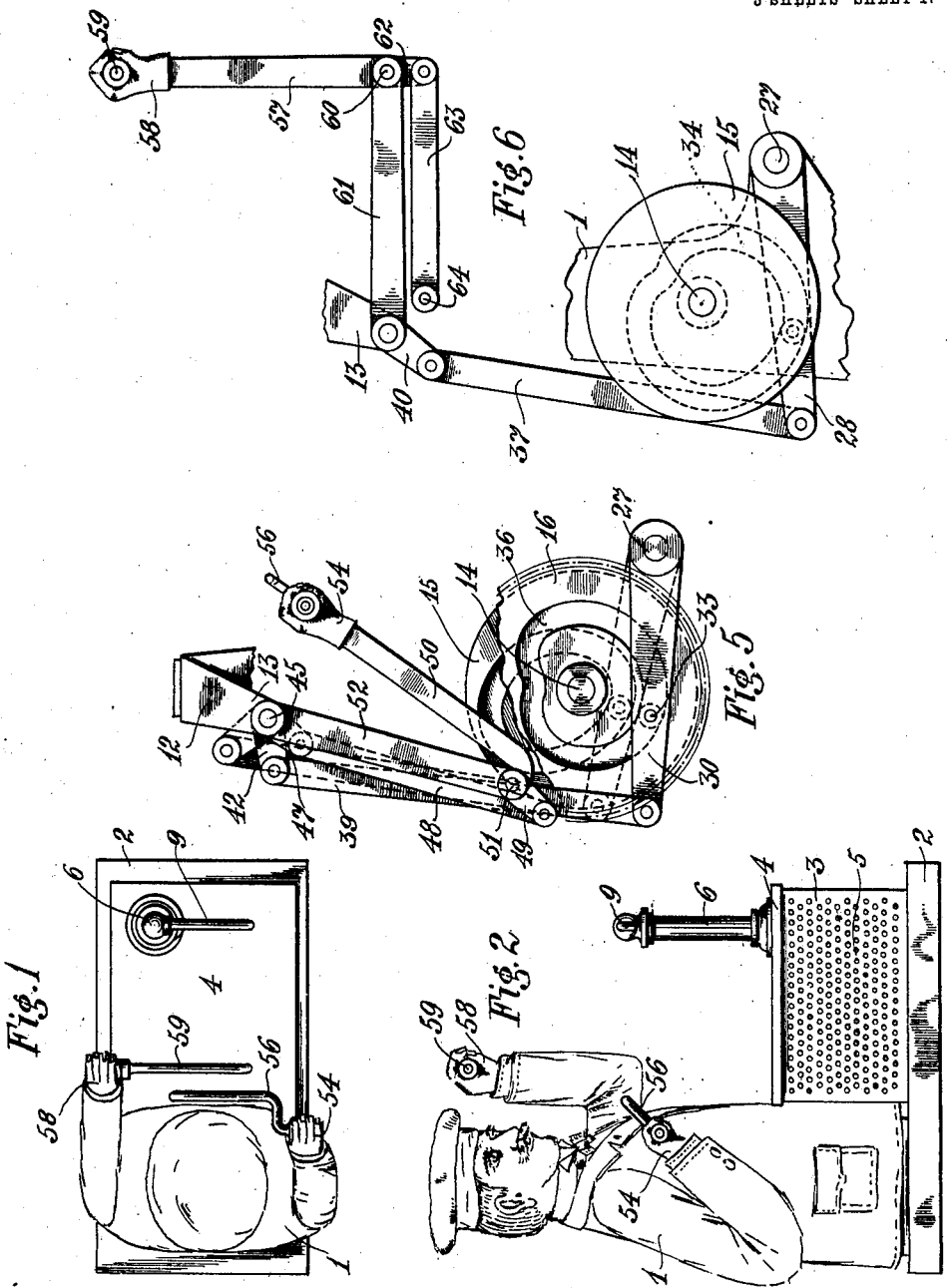

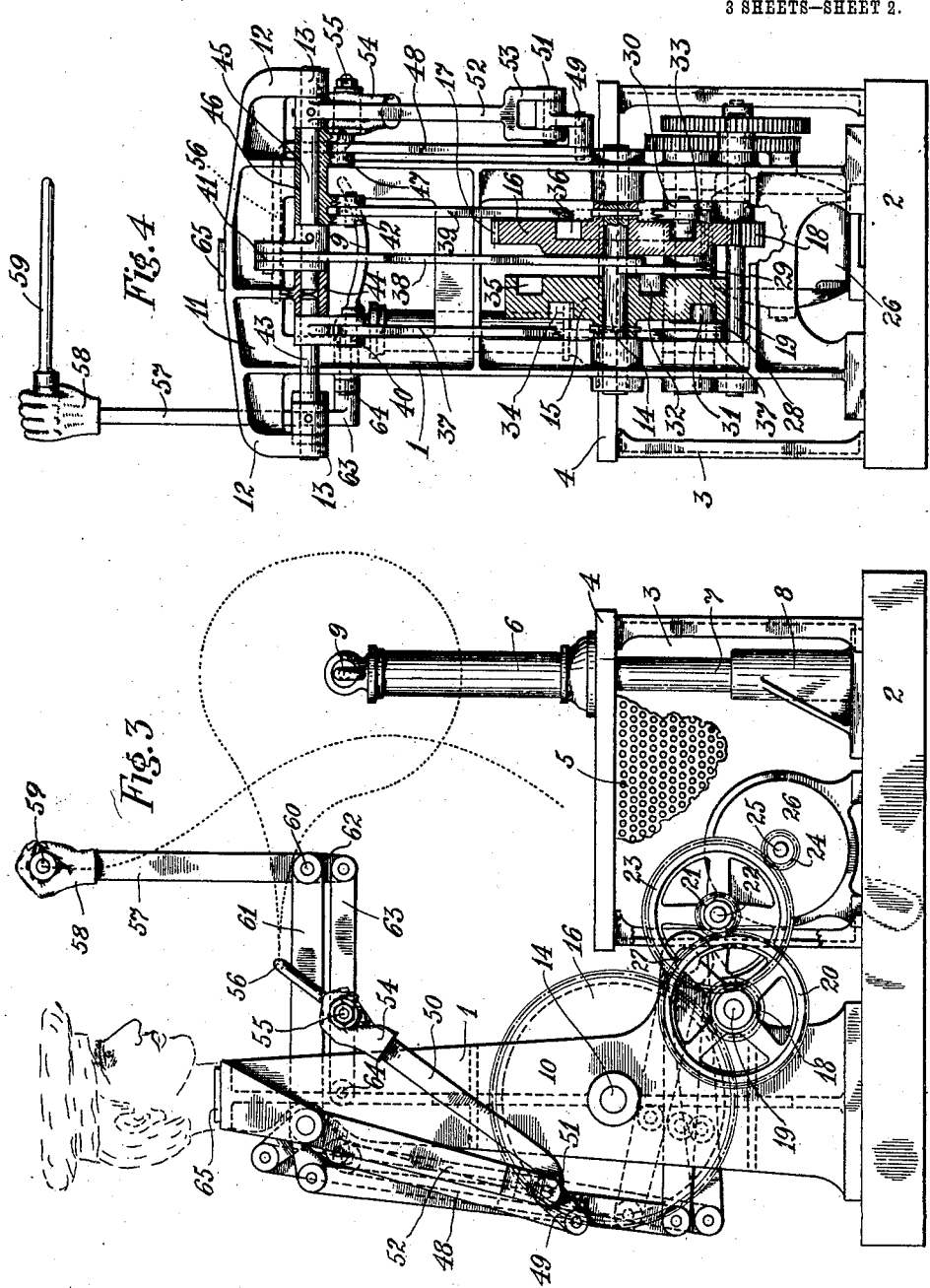

No. 830,468. PATENTED SEPT. 4, 1906.
C. M. WAITE.
CANDY PULLING MACHINE.
APPLICATION FILED APR. 14, 1906.

3 SHEETS—SHEET 3.

WITNESSES:
W. C. Schornborn
J. R. Martin.

INVENTOR
Charles M. Waite
BY
John H. Koch
his ATTORNEY

UNITED STATES PATENT OFFICE.

CHARLES M. WAITE, OF BROOKLYN, NEW YORK.

CANDY-PULLING MACHINE.

No. 830,468.  Specification of Letters Patent.  Patented Sept. 4, 1906.

Application filed April 14, 1906. Serial No. 311,634.

*To all whom it may concern:*

Be it known that I, CHARLES M. WAITE, a citizen of the United States, residing at the borough of Brooklyn, in the county of Kings and State of New York, have invented certain new and useful Improvements in Candy-Pulling Machines, of which the following is a specification.

While candy-pulling machines have been employed in a purely manufacturing capacity for pulling large quantities of candy in factories, by far the greatest use of such machines has been for the purpose of attracting attention, and thus serving the double purpose of performing useful work in the sense of pulling candy and serving as an advertising medium. For this purpose such machines are exhibited in show-windows of candy-stores, and especially at summer resorts and amusement-parks, where experience has shown that they materially enhance the prosperity of candy-merchants by attracting customers.

The primary object of this invention is to increase to a still greater degree the advertising quality of such machines by increasing their power to attract passers-by, while at the same time not sacrificing any of the purely manufacturing qualities of the machine.

Automatic candy-pulling as accomplished by the machines now in commercial use is effected by causing two or more machine-propelled relatively movable hooks or rods to manipulate a batch of candy. In such machines no pretense is made at anything like movements such as would be gone through by a human being in pulling candy. In fact, such machines depend largely for their attractiveness upon the fact that the operation is being performed absolutely by machine instead of by an individual. Directly opposed to this idea, it is the purpose of my invention to make the machine as human-like in its operation as practicable, and for this purpose I cause the manipulation of the relatively movable candy-pulling hooks by means of an automaton representing a human figure and possessing such qualities as will not only readily attract the ordinary passer-by, but will very effectively pull the candy.

In order to more fully describe my said invention, reference will be had to the accompanying drawings, wherein—

Figure 1 is a top plan view of one form of the machine complete; Fig. 2, a side elevation of the same; Fig. 3, a side elevation of the machine with the figure covering removed; Fig. 4, a rear elevation of the same, partly in section; Fig. 5, a diagrammatic view of the right arm and its actuating mechanism; Fig. 6, a diagrammatic view of the left arm and its actuating mechanism; Figs. 7, 8, 9, 10, 11, 12, 13, 14, 15, 16, 17, and 18 are diagrams showing the various positions of the manipulating members of the machine during one complete cycle of operation, illustrating the manner in which the candy is manipulated.

Referring to the accompanying drawings, 1 represents the automaton, which in the case illustrated represents the upper portion of a human figure clad, preferably, in the conventional coat and cap of a confectioner and mounted on a suitable base 2, facing a box-like table or support 3, also mounted on said base and provided with a preferably marble top 4 and perforated metal sides 5. Upon the top 4 is mounted a hollow upright 6, down through which extends a rod 7 into a socket 8. This rod 7 is held rigidly in position and carries at its upper end a substantially horizontal downwardly-curved candy-hook 9.

The mechanism of the automaton comprises, among other parts, an upright frame 10, mounted fast upon the base 2 and terminating at its upper end in a yoke portion 11, having shoulders 12, provided with overhang bearings 13. Within this frame is journaled a main shaft 14, upon which are keyed two cams 15 and 16. The cam 16 is provided with peripheral gear-teeth 17, which mesh with the teeth of a pinion 18, fast on a shaft 19, journaled in said frame. This shaft 19 carries also a gear-wheel 20, which meshes with a pinion 21, carried by shaft 22, mounted in the box 3 and in turn carrying a gear-wheel 23, which meshes with the pinion 24, carried upon the armature-shaft 25 of an electric motor 26, inclosed within said box. Obviously any other suitable source of power may be employed; but the arrangement shown is a very desirable one. Also journaled in the main frame 10 is a shaft 27, upon which three cam-levers 28, 29, and 30 are mounted for angular movement. These cam-levers carry, respectively, rollers or lugs 31, 32, and 33. The rollers 31 and 32 engage, respectively, with cam-slots 34 and 35, formed in opposite sides of the cam 15, while the roller 33 engages with a cam-slot 36 in one face of the cam 16. It will therefore be obvious that as the cams 15 and 16 are rotated by means of the electric motor and gearing described certain movements will be imparted to the levers 28, 29, and 30, corresponding to the courses of the respective cam-slots. The levers 29 and 30 control the movement of the right arm of the automaton, while the lever 28 controls the movements of the left arm. The oscillating ends of the levers 28, 29, and 30 are connected, respectively, to connecting-rods 37, 38, and 39, which are in turn connected at their upper ends to rocking levers 40, 41, and 42, the lever 40 being mounted fast on a rocking shaft 43, journaled at one end in the overhang bearing 13 and at its other end in a bearing 44, carried by the yoke of the machine-frame.

Coaxial with, but independent of, rocking shaft 43 is a rocking shaft 45, journaled at one end in bearing 44 and at the other end in the other or right-hand overhang bearing 13. The rocking lever 41 is mounted fast upon shaft 45, while lever 42 is integral with a sleeve 46, mounted loosely upon the said shaft 45. Also integral with said sleeve 46 is a rocking lever 47, to which is fulcrumed a connecting-rod 48, and to the lower end of this rod is fulcrumed an extension 49 of the right forearm 50 of the automaton. This forearm is also fulcrumed, as at 51, to form the elbow-joint with the upper right-arm portion 52, the said upper arm portion being bifurcated at its lower end, as at 53, to receive the end of the forearm. The upper end of the upper right forearm is mounted fast on the rock-shaft 45, while the forearm 50 is provided with a hand 54, to which is secured, by means of a bolt 55, an offset candy-pulling hook, rod, or other desired candy-manipulating member 56.

In the present machine the movement imparted to the right arm will cause the hook 56 to describe an irregular loop around the stationary hook 9, taking a course indicated by the pear-shaped figure in dotted lines, Fig. 3, and repeating this movement over and over. This movement, as will be seen, is secured by combining with a small oscillation of the upper right arm 52 on the rock-shaft 45 as a fulcrum an oscillation of the forearm 50 on the elbow-joint as a fulcrum. The first of these movements is controlled by the cam-slot 35 acting upon cam-roller 32 and thence through lever 29, rod 33, rocking lever 41, and thence to rock-shaft 45, causing a rocking motion of the arm 52. The second motion, or the oscillation of the forearm on its elbow, is controlled by the cam-slot 36 acting on cam-roller 33 and thence through lever 30, connecting-rod 39, rocking lever 42, sleeve 46, lever 47, connecting-rod 48, to the extension 49 of the forearm.

The left arm comprises, among other parts, a forearm-piece 57, provided with a hand 58, to which is rigidly secured a preferably straight rod or candy-manipulating hook 59, the said forearm-piece 57 being fulcrumed, as at 60, to a link or connecting-rod 61, made fast at one end to the rock-shaft 43. An extension 62 of the forearm 57 beyond the elbow-joint 60 is pivotally to a lever 63, fulcrumed to the frame of the machine, as at 64. In the present machine the motion imparted to the hook 59 is an up-and-down motion, the hook describing a reverse linear curve—such, for example, as that shown in dotted lines in Fig. 3—which the said hook will retrace over and over as the machine operates, the path of the hook 59 crossing and recrossing that of the hook 56. This movement of the left hand or arm carrying the hook 59 is controlled by the cam-slot 35 acting upon cam-roller 31 and thence through lever 29, connecting-rod 38, rocking lever 41, to rock-shaft 43, from which oscillating motion is transmitted to lever 61. As the lever 61 oscillates it will coöperate with the link or lever 63 to cause the forearm to move as described.

The object of the peculiar motions imparted to the members 56 and 59 will hereinafter more fully appear. The movements of the members 56 and 59 and mechanism for operating the same may, however, be modified without departing from the spirit of my invention.

In addition to its purely mechanical function of forming a support for the bearings of rock-shafts 43 and 45 the yoke 11 of the machine acts as a supporting form for the coat of the automaton or other covering for the actuating mechanism. The head of the automaton may be secured to the machine-frame in any suitable way. In the case shown it is mounted on a neck-piece 65, formed on the top of the yoke 11.

While I have shown an automaton whose head is adapted to remain stationary during the operation of the machine, I may embody in the automaton such well-known features as an automatically-movable head, jaw, tongue, eyes, &c. The manner of effecting such movements being old and well known in the art of making automatons need not here be described in detail.

Figure 11:
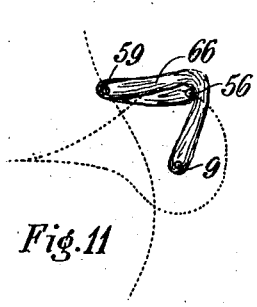
Figure 12:
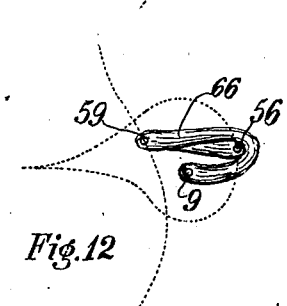
Figure 13:
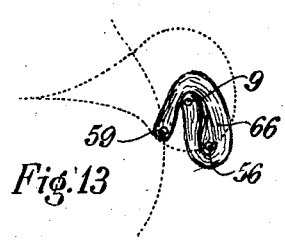
Figure 14:
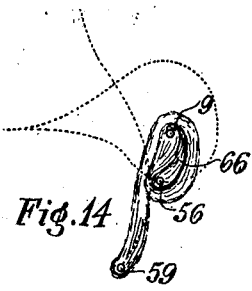
Figure 15:
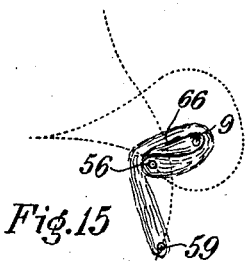
Figure 16:
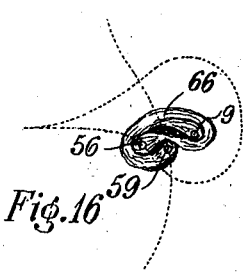
Figure 17:
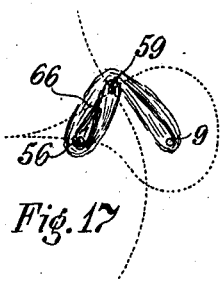
Figure 18:
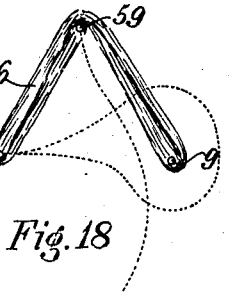

The operation of the machine is as follows: A batch of candy is prepared, which may be the same as for pulling by hand, and after the machine has been started this candy, after being drawn out somewhat into an elongated mass, is laid upon the hooks 9, 56, and 59, preferably when they are closest together, which will be when they are in the positions shown in Fig. 16. The curvature given the hook 9 causes the candy to seek the center of the hook, and therefore prevents it from slipping off. If desired, the hooks 56 and 59, which are shown straight, may also be curved; but it has been found that the curvature of the hook 9 alone is sufficient to keep the candy on the hooks under ordinary circumstances. As the machine continues its operation the hook 59 moves up and down in the path described and acts alone to pull the candy, while the hook 56, moving in the path described, acts alone to fold or bend the candy back upon itself. These two actions are separate and distinct and will be clear from the diagrams Figs. 7 to 18, inclusive, which show how a batch of candy is manipulated during one complete cycle of the travel of the hooks 56 and 59. In Fig. 7 the hooks 56 and 59 are shown at the commencement or end of their travel through their respective cycles after having operated on a batch of candy 67 long enough to get it in good pulling condition. From Figs. 8, 9, and 10 it will be seen that hook 56 progresses a considerable distance before hook 59 moves perceptibly, the hook 56 acting all the while to fold the candy back upon itself. In Figs. 11, 12, and 13, however, the hook 59 has moved perceptibly, while the hook 56 is still continuing its folding operation. In Fig. 14 the hook 59 has taken a decided move and crossed the path of the hook 56 and reached the extreme limit of its downward movement. In Fig. 15 the hook 59 has started upon its return or upward movement and in Fig. 16 is again crossing the path of hook 56, the latter all the while continuing upon its travel in describing a loop around the stationary hook 9. In Fig. 17 the hook 59 is shown well upon its return stroke, in which it is commencing to pull the batch of candy out in the triangular shape shown in Fig. 18, which shows the hooks at the end of the cycle. It will therefore be seen that all of the actual pulling is done by the hook 59, carried by the left hand of the automaton, while the hook 56, carried by the right hand, only folds the candy. The above-described cycle of operations is repeated over and over until the candy has been properly pulled, when it may be removed from the machine.

In using the term "automaton" without any limitation as to the nature of the automaton I desire to be understood as using the term in its broader sense to include any mechanically-operated figure, whether this figure represents a human being, a part of a human being, or any other animate object.

What I claim is—

1. In a candy-pulling machine, an automaton having limbs comprising mechanically-movable lever-arms, movable fulcra therefor, and candy-manipulating means carried by said lever-arms.

2. A candy-pulling machine, comprising an automaton representing a human figure and having articulated arms movable to manipulate the candy.

3. A candy-pulling machine, comprising an automaton representing a human figure and having articulated arms movable to manipulate the candy, and a candy-support to coöperate therewith.

4. A candy-pulling machine, comprising an automaton representing a human figure and having articulated arms, means to impart motion to said arms, means operated by one of said arms to perform the pulling act only and means operated by the other of said arms to perform the folding act only on the candy under manipulation.

5. A candy-pulling machine, comprising an automaton representing a human figure and having articulated arms, means to impart motion to said arms for the purpose of pulling candy, means operated by one of said arms to perform the pulling act only, means operated by the other of said arms to perform the folding act only on the candy under manipulation, and a relatively fixed support to hold the candy during manipulation.

6. A candy-pulling machine, comprising relatively movable candy-manipulating members, lever-arms carrying said members, and movable fulcra for said arms.

7. A candy-pulling machine, comprising candy-manipulating members relatively movable each in a different path, and articulated lever-arms supporting said members, and means to operate said arms.

8. A candy-pulling machine, comprising candy-manipulating members relatively movable each in a different path, an articulated lever-arm adapted to support and operate each of said members, and a relatively stationary candy-supporting hook to coöperate with said movable members.

9. A candy-pulling machine, comprising candy-manipulating members relatively movable each in a different path, one of said members adapted to perform the pulling act only and the other the folding act only on the candy under manipulation, an articulated lever-arm adapted to support and operate each of said lever members, and mechanism to operate said arms.

10. A candy-pulling machine, comprising candy-manipulating members relatively movable each in a different path, one of said members adapted to perform the pulling act only and the other the folding act only on the candy under manipulation, an articulated lever-arm adapted to support and operate each of said lever-hooks, mechanism to operate said arms, and a relatively stationary candy-support adapted to hold the candy during manipulation by said movable members.

11. A candy-pulling machine, comprising a stationary candy-supporting hook, two relatively movable candy-manipulating members, one adapted to describe a loop around said stationary hook and the other adapted to have an approximately rectilinear motion and intersecting the path of the other movable member at two points, and mechanism to support and impart the said motions to said members.

12. A candy-pulling machine, comprising a stationary candy-supporting hook, two relatively movable candy-manipulating members, one adapted to describe a loop around said stationary hook and the other adapted to have an up-and-down approximately rectilinear motion across the path of the other movable member and an articulated arm to support and operate each of said movable members, and mechanism to operate said arms.

13. A candy-pulling machine, comprising a stationary candy-supporting hook, two relatively movable candy-manipulating members, one adapted to describe a loop around said stationary hook and the other adapted to have an up-and-down approximately rectilinear motion across the path of the other movable member and to intersect said path at two points, and an automaton representing a human figure and having arms movable to impart the said motions to said members.

14. A candy-pulling machine, comprising a stationary candy-supporting hook, two relatively movable candy-manipulating members, one adapted to describe a loop around said stationary hook and the other adapted to have an up-and-down approximately rectilinear motion across the path of the other movable member, an automaton representing a human figure having articulated arms and carrying one of said movable members in each of its hands, and mechanism to impart motion to said arms.

15. A candy-pulling machine, comprising a stationary candy-supporting hook, an automaton representing a human figure located in proximity to said hook and having articulated arms, a pair of candy-manipulating hooks, one carried in each of the automaton's hands, mechanism contained within the automaton and coöperative with said manipulating-hooks to cause one of said hooks to travel in the path of a loop to fold the candy and to cause the other of said manipulating-hooks to have an up-and-down motion across the path of the other manipulating-hook to pull the candy, substantially as described.

16. A candy-pulling machine, comprising a stationary candy-supporting hook, two relatively movable candy-manipulating members, means to cause one of said relatively movable members to describe a loop around said stationary hook and the other of said members to have an oscillating movement across the path of said loop to intersect the same at two points.

17. A candy-pulling machine, comprising a stationary candy-supporting hook, two relatively movable candy-manipulating members, an articulated arm to support and operate each of said movable members, and mechanism to operate said arms to cause one of said members to describe a loop around said stationary hook and the other of said members to have an oscillating movement across the path of the loop described by the other of said members and intersecting the same at two points.

18. A candy-pulling machine, comprising a stationary candy-supporting hook, two relatively movable candy-manipulating members, an automaton representing a human figure having articulated arms and carrying one of said movable members in each of its hands, and mechanism to impart motion to said arms to cause one of said members to describe a loop around said stationary member and the other of said members having an oscillating movement across the path of the loop described by the other of said members and intersecting the same at two points.

19. A candy-pulling machine comprising a plurality of candy-manipulating members, and means to move said members in dissimilar asymmetrical paths.

20. A candy-pulling machine comprising a stationary candy-manipulating member, a plurality of relatively movable candy-manipulating members adapted to coöperate with said stationary member, and means to move said relatively movable members in dissimilar asymmetrical paths.

In testimony whereof I affix my signature in presence of two witnesses.

CHARLES M. WAITE.

Witnesses:
    E. A. FALLER,
    F. N. REEVES.